United States Patent
Ben-Shaul et al.

(10) Patent No.: US 8,332,485 B1
(45) Date of Patent: Dec. 11, 2012

(54) LOCK OPTIMIZATION AND LOCK PREDICTION APPROACHES FOR REDUCING CLIENT-SERVER MESSAGES

(75) Inventors: Israel Zvi Ben-Shaul, Palo Alto, CA (US); Idan Zach, Nesher (IL); Etai Lev-Ran, Nofit (IL); Shahar Glixman, Kiryat Tivon (IL)

(73) Assignee: Cisco Technology, Inc., San Jose, CA (US)

( * ) Notice: Subject to any disclaimer, the term of this patent is extended or adjusted under 35 U.S.C. 154(b) by 1537 days.

(21) Appl. No.: 11/073,046

(22) Filed: Mar. 4, 2005

(51) Int. Cl.
*G06F 15/16* (2006.01)
*G06F 7/00* (2006.01)
*G06F 17/00* (2006.01)

(52) U.S. Cl. .................. 709/219; 707/704; 707/999.008
(58) Field of Classification Search .............. 707/8, 704; 710/200; 709/202–3, 219, 234, 235
See application file for complete search history.

(56) References Cited

U.S. PATENT DOCUMENTS

| | | | |
|---|---|---|---|
| 4,498,142 A | 2/1985 | Advani et al. | |
| 4,916,605 A | 4/1990 | Beardsley et al. | |
| 5,454,108 A * | 9/1995 | Devarakonda et al. | 718/104 |
| 5,483,657 A | 1/1996 | Hatakeyama | |
| 5,555,388 A * | 9/1996 | Shaughnessy | 711/100 |
| 5,560,008 A | 9/1996 | Johnson et al. | |
| 5,596,754 A * | 1/1997 | Lomet | 710/200 |
| 5,682,534 A | 10/1997 | Kapoor et al. | |
| 5,740,367 A * | 4/1998 | Spilo | 709/201 |
| 5,745,747 A * | 4/1998 | Chang et al. | 707/8 |
| 5,956,712 A * | 9/1999 | Bennett et al. | 707/8 |
| 6,182,139 B1 | 1/2001 | Brendel | |
| 6,189,046 B1 | 2/2001 | Moore et al. | |
| 6,282,581 B1 | 8/2001 | Moore et al. | |
| 6,405,274 B1 * | 6/2002 | Chan | 710/200 |
| 6,408,342 B1 | 6/2002 | Moore et al. | |
| 6,567,405 B1 | 5/2003 | Borella et al. | |
| 6,574,654 B1 * | 6/2003 | Simmons et al. | 718/104 |
| 6,667,700 B1 | 12/2003 | McCanne et al. | |
| 6,668,270 B1 * | 12/2003 | Simmons et al. | 718/104 |

(Continued)

OTHER PUBLICATIONS

Randal C. Burns, et al., "Scalable Session Locking for a Distributed File System", Cluster Computing, published by Springer Science+Business Media B.V., Issue 4, No. 4, Oct. 2001, retrieved from the Internet <URL http://www.springerlink.com/app/home/contribution.asp?wasp on Jun. 22, 2005, pp. 1-25.

(Continued)

*Primary Examiner* — George C Neurauter
(74) *Attorney, Agent, or Firm* — Schwegman, Lundberg & Woessner, P.A.

(57) ABSTRACT

Approaches are disclosed for lock optimization and lock prediction for reducing the number of client-server messages involved in working with server-based resources. First one or more lock requests for first one or more locks on a remote data resource that is linked by a slow communication link are received. Based on the first one or more lock requests, a sequence of lock requests for locks on the remote data resource is determined. A first message that includes the sequence of lock requests is sent. A second message is received. The second message includes second one or more locks on the remote data resource, where the second one or more locks correspond to second one or more lock requests of the sequence of lock requests. A particular lock of the second one or more locks is granted in response to receiving a particular lock request for the particular lock on the remote data resource.

35 Claims, 5 Drawing Sheets

U.S. PATENT DOCUMENTS

| | | | |
|---|---|---|---|
| 6,668,295 B1* | 12/2003 | Chan | 710/200 |
| 6,828,925 B2 | 12/2004 | McCanne et al. | |
| 7,047,299 B1* | 5/2006 | Curtis | 709/225 |
| 7,047,536 B1 | 5/2006 | Duncan et al. | |
| 7,116,249 B2 | 10/2006 | McCanne et al. | |
| 7,139,811 B2 | 11/2006 | Lev Ran et al. | |
| 7,299,282 B2 | 11/2007 | Sarkissian et al. | |
| 7,424,722 B2 | 9/2008 | Joseph | |
| 2002/0019874 A1 | 2/2002 | Borr | |
| 2003/0009480 A1 | 1/2003 | Lin et al. | |
| 2003/0018785 A1* | 1/2003 | Eshel et al. | 709/226 |
| 2003/0018878 A1 | 1/2003 | Dorward et al. | |
| 2003/0195937 A1 | 10/2003 | Kircher, Jr. et al. | |
| 2004/0088376 A1 | 5/2004 | McCanne et al. | |
| 2004/0168057 A1 | 8/2004 | Margolus | |
| 2004/0168058 A1 | 8/2004 | Margolus | |
| 2004/0174276 A1 | 9/2004 | McCanne | |
| 2004/0215746 A1* | 10/2004 | McCanne et al. | 709/219 |
| 2004/0243703 A1 | 12/2004 | Demmer | |
| 2005/0125553 A1 | 6/2005 | Wu et al. | |
| 2005/0273792 A1 | 12/2005 | Inohara et al. | |
| 2006/0009213 A1 | 1/2006 | Sturniolo et al. | |

OTHER PUBLICATIONS

U.S. Appl. No. 11/141,761, filed May 31, 2005.
U.S. Appl. No. 11/290,188, filed Nov. 29, 2005.
U.S. Appl. No. 11/255,816, filed Oct. 21, 2005.
Academic Press Dictionary of Science and Technology, Elsevier Science and Technology (1992), Retrieved Aug. 13, 2008, from http://www.credoreference.com/entry/3086303/.
Burns, Randal C, et al., "A Linear Time Constant Space Differencing Algorithms", Performance Computing and Communications Conference, [Online]. Retrieved from the Internet: URL:<http://www.almaden.ibm.com/projects/data/storagesystems/ipccc97.pdf>, (Feb. 5-7, 1997), 429-436.
Leach, Paul, et al., "CIFS: A Common Internet File System", MSDN, Microsoft Internet Developer, [Online]. Retrieved from the Internet: <URL: http://www.microsoft.com/mind/1196/cifs.asp>, 11 pgs.
Muller, Gilles, et al., "Fast, Optimized Sun RPC Using Automatic Program Specialization", (1998), 10 pgs.
Muthitacharoen, Athicha, et al., "A Low-Bandwidth Network File System", ACM Symposium on Operating Systems Principles, Proceedings of the eighteenth ACM symposium on Operating systems principles, (2001), 174-187.
Narender, Vangati R., et al., "Dynamic RPC for Extensibility", IPCCC '92, (1992), 93-100.
Schleimer, Saul, et al., "Winnowing: Local Algorithms for Document Fingerprinting", ACM Sigmond Conference, [Online]. Retrieved from the Internet: <URL: http://theory.stanford.edu/~aiken/publications/papers/sigmod03.pdf>, (Jun. 9-12, 2003), 10 pgs.
SNIA, "Common Internet File System (CIFS) Technical Reference, Revision 1.0", Storage Networking Industry Association, Technical Proposal, (Mar. 1, 2002), 150 pgs.
Spring, Neil T, "A Protocol-Independent Technique for Eliminating Redundant Network Traffic", Proceedings of the 200 ACM SIGCOMM Conference, [Online]. Retrieved from the Internet: <URL: https://www.cs.washington.edu/homes/djw/papers/spring-sigcomm00.pdf>, (Aug. 2000), 87-95.
Tridgell, Andrew, et al., "The rsync Algorithm", [Online]. Retrieved from the Internet: <URL: http://rsync.samba.org/tech_report/tech_report.html>, (Nov. 9, 1998), 10 pgs.
Zelesko, Matthew J., et al., "Specializing Object-Oriented RPC for Functionality and Performance", IEEE Proceedings of the 16th ICDCS, (1996), 175-187.

* cited by examiner

LOCK OPTIMIZATION AND LOCK PREDICTION APPROACHES FOR REDUCING CLIENT-SERVER MESSAGES

FIELD OF THE INVENTION

The present invention generally relates to client-server communications. The invention relates more specifically to lock optimization and lock prediction approaches for reducing the number of client-server messages involved in working with server-based resources.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Geographically dispersed enterprises often deploy distributed computer systems in order to enable information sharing throughout the enterprise. Such distributed systems generally comprise an enterprise network, which includes a number of Local Area Networks (LANs) that are connected over one or more Wide Area Network (WAN) communication links. An enterprise network generally includes one or more servers that store enterprise information in one or more data resources. The servers supply the data from the resources upon receiving requests for the data from other enterprise servers or clients, which servers or clients may be established in the LAN that is local to the data resource or may be established in a LAN that is located across the WAN.

For example, the business structure of an enterprise may comprise a main office, and one or more branch offices. To support this business structure, the enterprise typically employs a local LAN for each of the main and branch offices, and one or more WAN communication links that connect the LANs at the branch offices with the LAN at the main office. This network infrastructure enables users at the branch offices, who run software applications locally on their workstations, to access files that are located at the main office.

While this network infrastructure allows for greater sharing of information for users throughout the enterprise, it also has a significant disadvantage because software applications that access data resources are primarily designed to access the data resources over a relatively high-speed LAN. Usually, significant latency and performance degradation are observed when a software application accesses a data resource that is located across the WAN in a remote LAN. In a typical example, an enterprise user in a branch office uses a word-processing application to access and modify files. Usually, operations on files that are in the LAN local to the user are relatively quick, while operations on files that are located across the WAN are relatively slow and sometimes unreliable.

One of the reasons for the above-described performance degradation is the high number of lock operations performed by a software application before the user is provided access to the requested data resource. The software application, usually in cooperation with a server or an operating system that manages the data resource, needs to perform the lock operations in order to provide greater sharing of the data resource while properly managing updates and changes to the resource. When the software application accesses the data resource over a LAN connection, it performs the lock operations relatively quickly because of the low latency and high connectivity speed of the connection, and the user usually gets fast response times. However, when the software application accesses the data resource over a slow WAN connection, the software application must perform each required lock operation remotely by sending sequences of messages over a slow communication link, and as a result the latency in response times for the user is relatively high. Even if the WAN link has sufficient bandwidth, the WAN latency still causes the lock message exchange to be slow.

For example, in order to open a file for read-only access, a Microsoft Word® word-processing application exchanges between thirteen and sixteen round trip lock operation messages with a file server that controls access to the file. When the client on which the user executes the word-processing application and the server which controls access to the file are coupled over a WAN connection, network latency may introduce an undesirable or even unacceptable delay in completing the file open operation because of the time needed to communicate so many lock operation messages. From the user's perspective, opening the file in the word-processing application takes too long. Similarly, in another example, saving a file with Microsoft Word® involves between forty and fifty round trip lock operation messages between the client and the file server that controls access to the file. In both examples, the lock request messages are synchronous, that is, the client does not send the next lock request message before the response from the previous lock request message has arrived, thus creating an unacceptable delay. Furthermore, during the time that the application is waiting for exchange of lock messages to occur, the network link is underutilized by the application, further delaying the transfer of data between the client and the server.

One general approach to improve the response times for performing operations on a remote data resource involves the technique of data replication. Replication entails maintaining multiple identical copies, also referred to as replicas, of the data resource in multiple locations throughout the enterprise network. Requests from clients for the data resource are manually or automatically re-directed to the local or topologically closest replica of the data resource.

The principal disadvantage of replication is that it requires high bandwidth network connections to maintain all the replicas up-to-date and to ensure consistency between the replicas. Another disadvantage is that the number and size of the required replicas and the complexity and size of the network often limit the level of consistency that can be achieved between the replicas. Yet another disadvantage of replication is the "loss of single copy semantics." In other words, when clients change different replicas, or use locks to coordinate access to different replicas, the single data resource operations semantics are lost because there is no single master copy of the data resource. Furthermore, this approach does not address the specific problem created by software applications that require the performance of a high number of lock operations over a slow communication link before providing access to a data resource.

Based on the foregoing, there is a clear need for a technique providing lock optimization and lock prediction to reduce the number lock operation messages exchanged over a slow communication link in relation to file operations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Approaches for lock optimization and lock prediction are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

```
1.0    General Overview
2.0    Structural and Functional Overview
3.0    Approaches for Lock Optimization and Lock Prediction
       3.1    Predicting Lock Request Sequences
       3.2    Handling Misprediction of Lock Request Sequences
       3.3    Obtaining and Granting Locks Requested in Lock
              Sequence Requests
4.0    Implementation Mechanisms - Hardware Overview
5.0    Extensions and Alternatives
```

1.0 General Overview

The needs identified in the foregoing Background, and other needs and objects that will become apparent for the following description, are achieved in the present invention, which comprises, in one aspect, a method for lock optimization and lock prediction. First one or more lock requests for first one or more locks on a remote data resource that is linked by a slow communication link are received. Based on the first one or more lock requests, a sequence of lock requests for locks on the remote data resource is determined. A first message that includes the sequence of lock requests is sent. A second message is received. The second message includes second one or more locks on the remote data resource, where the second one or more locks correspond to second one or more lock requests of the sequence of lock requests. A particular lock of the second one or more locks is granted in response to receiving a particular lock request for the particular lock on the remote data resource.

In a feature of this aspect, in response to receiving the first message, a remote server obtains the one or more locks on the remote data resource. The remote date resource may be a file, and obtaining the second one or more locks may include locking, for each lock of the second one or more locks, a range of bytes in the file. The range of bytes may comprise one or more bytes, or may span the whole file. In addition, the remote server may obtain all or only some of the locks that are requested in the sequence of lock requests.

In one feature of the aspect, a third message is sent. The third message includes one or more unlock request to release at least one lock of the second one or more locks. In addition, or instead of, the one or more unlock requests may be requests to release at least one lock of the first one or more locks.

In a feature of the aspect, the particular request for the particular lock is received after receiving the first one or more requests for the first one or more locks.

In one feature of the aspect, an unlock request is received to release the particular lock.

In a feature of the aspect, the remote data resource is a file that is managed by a file server. The file server is communicatively connected to a remote server over a Local Area Network (LAN) connection. The remote server is connected to, and/or maintains, the slow communication link.

In one feature of the aspect, the first one or more lock requests for the first one or more locks is sent to a local server from an application. The application may be executing on either the local server or on a client that is communicatively connected to the local server over a LAN connection. The application may also be a distributed or a client-server application that is executing on both the local server and a client that is communicatively connected to the local server. In this feature, the application may send the first one or more lock requests to the local server in response to receiving, from a user, a request to perform an operation on the remote data resource. In addition, the aspect may further comprise performing the operation on the data resource.

In a feature of this aspect, a specific request for a specific lock on the remote data resource is received. A determination is made whether the specific lock is among the second one or more locks. If the specific lock is not among the second one or more locks, then a third message may be sent to release at least one lock of the first one or more locks and/or at least one lock of the second one or more locks.

In one feature of the aspect, the step of determining the sequence of lock requests comprises predicting the sequence of lock requests based on prior usage of the first one or more locks. The prior usage of the first one or more locks may be automatically determined based on trace files that store records indicating which locks were requested subsequently to prior requests for the first one or more locks.

In a feature of this aspect, the first one or more lock requests for the first one or more locks may be included in the sequence of lock requests. Alternatively, the first one or more requests may not be included in the sequence of lock requests.

In one feature of the aspect, the second one or more lock requests, to which the second one or more locks correspond, may be a subset of the sequence of lock requests. Thus, the second one or more locks on the remote data resource that are received in the second message may or may not include all locks that were requested in the sequence of lock requests.

In a feature of this aspect, the slow communication link may be any slow communication link now known or later developed including, but not limited to, a dial-up connection, a Wide Area Network (WAN) connection, a Digital Subscriber Line (DSL) connection, and an Integrated Services Digital Network (ISDN) connection.

In one aspect, an approach for optimizing communication exchanges is described. First one or more lock requests for first one or more locks on a remote data resource is received at a local server. The local server is communicatively connected to a remote server over a slow communication link. The remote server controls the local server's access to the remote data resource. Based on the first one or more lock requests, the local server determines a sequence of lock requests for locks on the remote data resource. The local server then sends a first message to the remote server, where the first message includes the sequence of lock requests. The local server receives from the remote server a second message that includes second one or more locks on the remote data resource. The second one or more locks correspond to second one or more lock requests in the sequence of lock requests. In response to a particular request for a particular lock of the second one or more locks, the local server grants the particular lock.

In a feature of this aspect, the local server sends to the remote server a third message that may include one or more unlock requests to release at least one lock of the second one or more locks. In addition, or instead of, the third message may include one or more unlock requests to release at least one lock of the first one or more locks.

In one feature of the aspect, the local server releases the particular lock of the second one more locks in response to receiving an unlock request to release the particular lock.

In one aspect, a system for optimizing communication exchanges is described. A remote server is communicatively connected to a file server over a LAN connection. The file server manages a data resource, such as, for example, a file. A local server is communicatively connected to the remote server over a WAN communication link. The local server comprises one or more processors, and one or more stored sequences of instructions. The one or more stored sequences of instructions, when executed by the one or more processors, cause the one or more processors to: receive first one or more lock requests for first one or more locks on the remote data resource; determine, based on the first one or more lock requests, a sequence of lock requests for locks on the remote data resource; send a first message to the remote server, where the first message includes the sequence of lock requests; receive from the remote server a second message that includes second one or more locks on the remote data resource, where the second one or more locks correspond to second one or more lock requests of the sequence of lock requests, and the remote server obtains the second one or more locks from the file server; and grant a particular lock of the second one or more locks in response to a particular request for the particular lock.

In other aspects, the invention encompasses a computer apparatus and a computer-readable medium configured to carry out the foregoing steps.

2.0 Structural and Functional Overview

Figure 1:
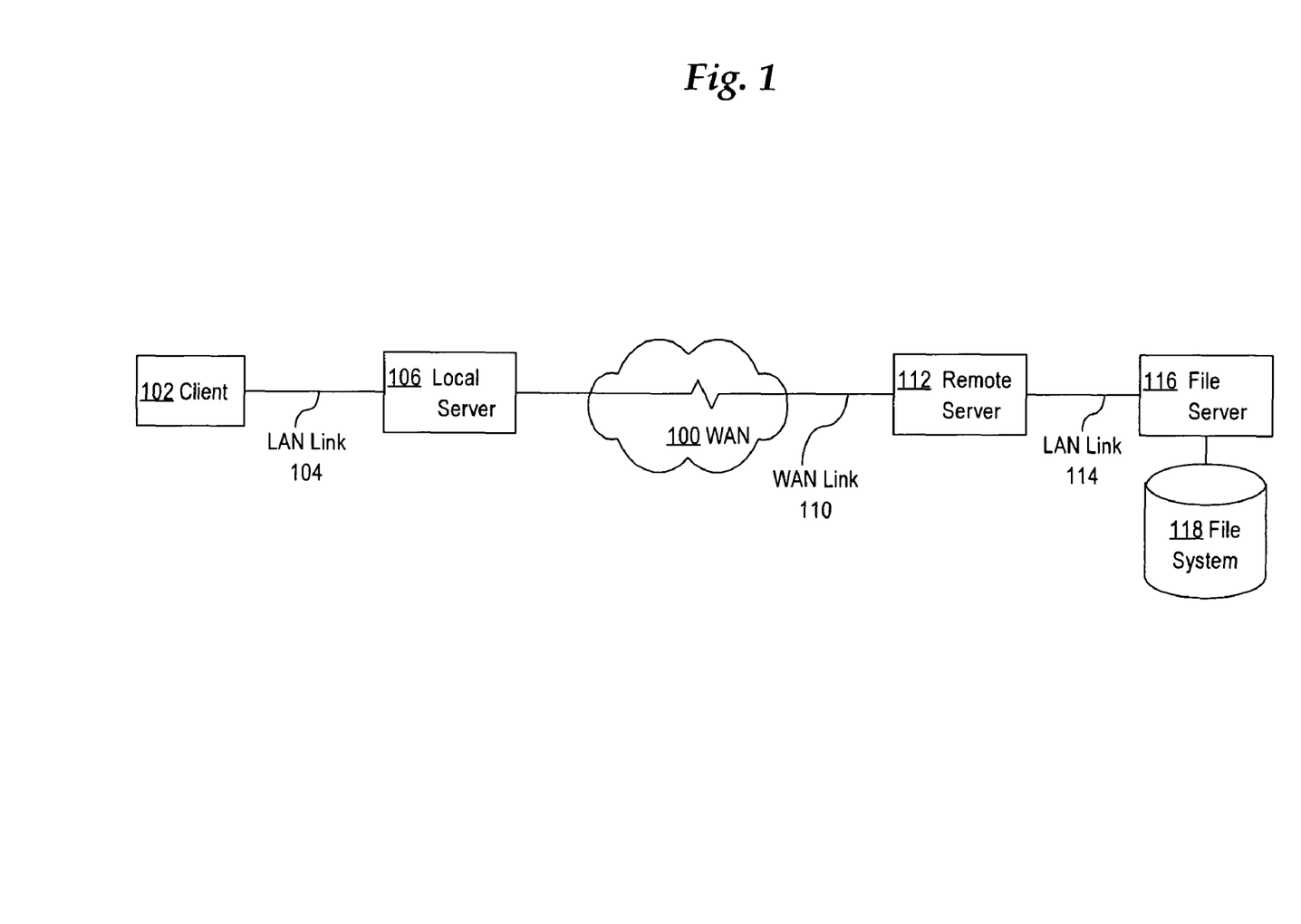
FIG. 1 is a block diagram that illustrates a high level overview of a system in which an embodiment may be implemented.

FIG. 1 is a block diagram that illustrates a high level overview of one system in which an embodiment may be implemented.

Client 102 is communicatively connected over a Local Area Network (LAN) link 104 to local server 106. Local server 106 provides access to Wide Area Network (WAN) 100 for one or more clients, such as client 102. Local server 106 is also communicatively connected, over WAN 100, to remote server 112 via WAN link 110. Remote server 112 is communicatively connected to one or more file servers, such as file server 116, over LAN links, such as LAN link 114. File server 116 manages one or more files in one or more file systems, such as file system 118.

In operation, local server 106 receives, from client 102, a request for a lock on a file stored in file system 118. Based on the request, local server 106 determines a sequence of lock requests for locks on the file. Local server 106 then sends to remote server 112 a message that includes the sequence of lock requests. Remote server 112 obtains one or more locks, which correspond to one or more lock requests of the sequence of lock requests, from file server 116. Remote server 112 then sends, and local server 106 receives, a message that includes the one or more locks. After storing the one or more locks locally, local server 106 may grant the one or more locks in response to subsequent requests for the one or more locks from client 102 without sending any messages to, and requesting locks from, remote server 112.

Embodiments may be implemented in operational contexts and/or in systems that are different than the operational context and the system depicted in FIG. 1. For example, in one embodiment, a client may perform the steps performed by the local server as described above. In this embodiment, the client may be connected to the remote server over a dial-up connection, DSL, an ISDN line, or any other type of slow or relatively slow communication link. Furthermore, the remote server itself may manage the file or files for which the client requests one or more locks. Moreover, embodiments may include any number of clients, servers, or resources. In addition, the local server may determine the sequence of lock requests based on more than one lock requests that are received from a client. Thus, the techniques and approaches described herein are not limited to any particular operational context or system, and the operational context and the system depicted in FIG. 1 are to be regarded in an illustrative rather than a restrictive sense.

Figure 3:
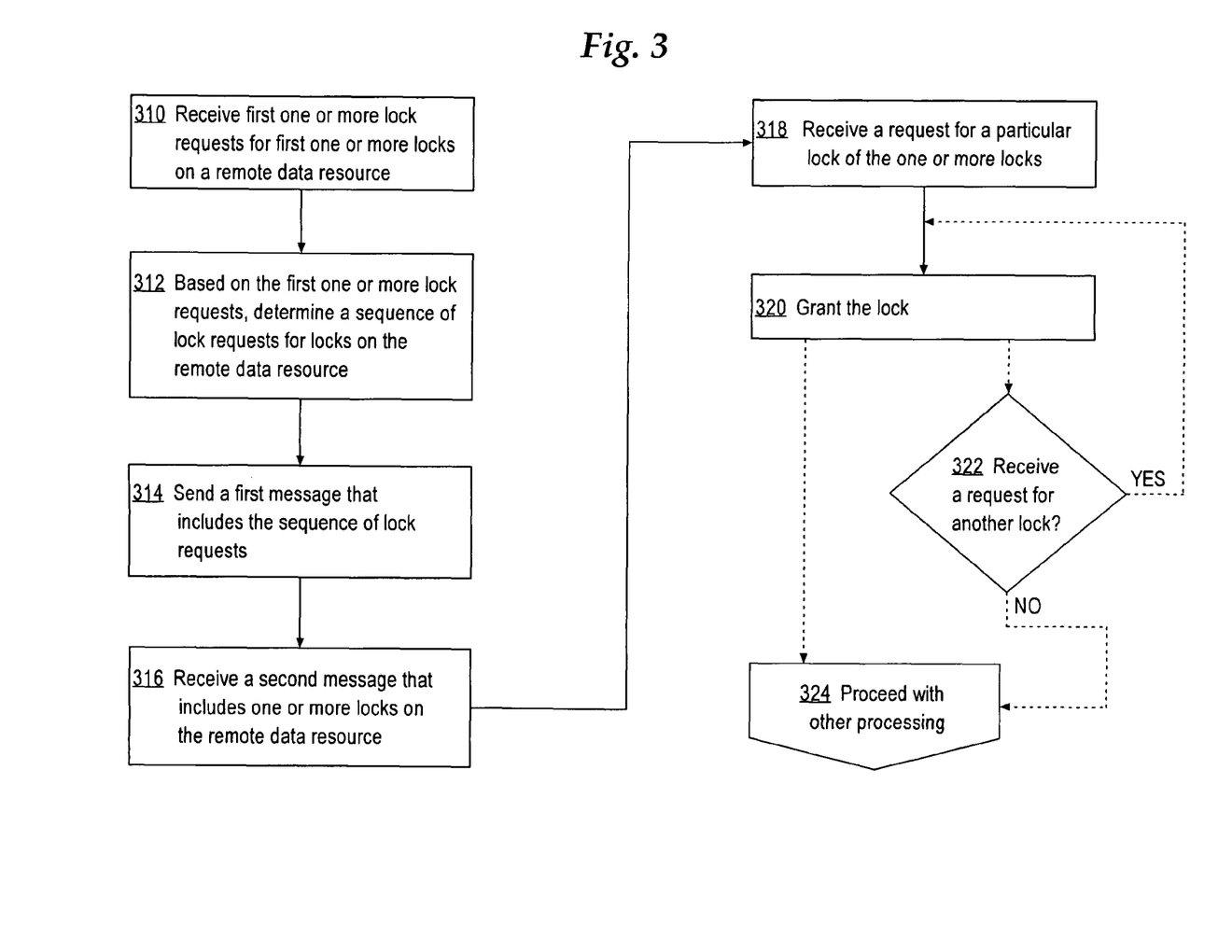
FIG. 3 is a flow diagram that illustrates a high level overview of one embodiment of a method for optimizing communication exchanges.

FIG. 3 is a flow diagram that illustrates a high level overview of one embodiment of a method for optimizing communication exchanges.

In step 310, first one or more lock requests for first one or more locks on a remote data resource are received. For example, local server 106 may receive from client 102 a request for a lock on a file stored in file system 118. Based on the first one or more lock requests, in step 312 a sequence of lock request for locks on the remote data resource is determined.

A first message including the sequence of lock requests is sent in step 314. For example, local server 106 may send to remote server 112 a message that includes the sequence of lock requests. Remote server 112 then may request the locks in the sequence from file server 116, and may send the obtained locks back to local server 106. In step 316 a second message that includes one or more locks on the remote data resource is received.

In step 318, a request for a particular lock of the one or more locks is received. The lock is granted in step 320. For example, local server 106 may receive from client 102 a request for a particular lock of the locks local server 106 received from remote server 112, and in response to the request local server 106 may grant the lock.

Thereafter, in step 324 it may be optionally proceeded with other processing. Alternatively, or in addition to, if a request for another lock is received in step 322, then the lock is granted in step 320. If in step 322 it is determined that requests for other locks are not to be received, then it may be proceeded with other processing as indicated in step 324.

A wide variety of known locks and lock operations may be performed on data resources. Furthermore, the data resources on which locks and lock operations may be performed may be any resources that can store data and that are managed by a computer system including, but not limited to, files in any format, directories of files, mountable file systems, databases, hard disk partitions, disk blocks within a disk partition, and removable data storage. Thus, the techniques described herein are not limited to any particular lock, lock operation, or data resource.

Locks, and the lock operations that may be performed on them, are generally mechanisms used by computer systems and software applications to control access to, and manage various resources. A lock is generally a grant to an entity, such as an instance of a software application that is executing on a client, to perform a particular operation or operations on a resource. A lock granted to such an entity may be exclusive, which indicates that only the particular entity is granted the right to perform a particular operation. Locks may also be shared, which indicates that a plurality of entities is granted the right to perform a particular operation.

With respect to the embodiments described herein, a lock operation is generally an operation performed to obtain a lock on a data resource, and an unlock operation is an operation performed to release a lock on a data resource. Unlock operations are closely associated with lock operations, because, typically, if a software application or computer process obtains a lock, then at some point the software application or the computer system usually releases the lock. Thus, as used herein, a lock request is a request to obtain a lock on a data resource, and an unlock request is a request to release a previously obtained lock. Lock and unlock requests may be included in messages that are exchanged with a computer system or a software application that manages access to a data resource. In some embodiments, such a message may include one or more lock and/or unlock requests.

Lock operations on a data resource may be implemented in a variety of ways. In some embodiments, lock operations may be implemented by providing one or more attributes in a data structure that is associated with the data resource. The values of the one or more attributes are used to indicate whether and to which entity a lock may be granted. The data structure may be stored within a data resource, or may be stored separate from the data resource. In this embodiment, the lock and unlock requests may be associated with modifying the values stored in the one or more attributes.

In other embodiments, lock operations may be implemented as granting and releasing access rights on ranges of one or more bytes in the data resource. In this embodiment, an unlimited number of shared locks may be obtained on a range of bytes, but only one exclusive lock may be granted on a previously unlocked range of bytes. In addition, shared and exclusive locks are typically honored as mandatory by the computer system granting or releasing the rights associated with the locks. For example, if a software application executing on a client holds an exclusive lock on a particular range of bytes, then no other software application that executes on this or another client can read from or write to the particular range of bytes. If a software application executing on a client holds a shared lock on a particular range of bytes, then any other software application that executes on this or another client may read from, but cannot write to, the particular range of bytes.

Figure 2A:
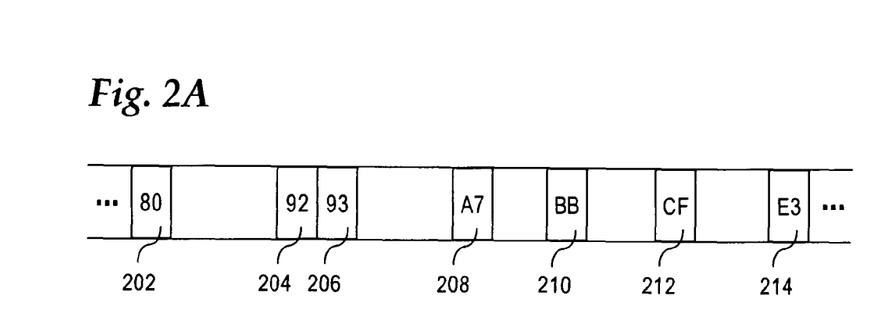
FIG. 2A is a block diagram that illustrates offsets in a data resource that may be locked according to one embodiment.

For example, FIG. 2A is a block diagram that illustrates offsets in a Microsoft Word® (MS-Word) file that may be locked according to this embodiment. An offset is a value representing the number of bytes from a particular point in the file, which is also called a base. The base may be the beginning of the file or may be any other point in the file according to a specific file format or determined by a specific application. The offsets depicted in FIG. 2A are from a hexadecimal base of "0x7FFFFF00", and are referenced by numerals 202-214. Thus, offset 202 has a hexadecimal value of "80", offset 204 has a hexadecimal value of "92", offset 206 has a hexadecimal value of "93", offset 208 has a hexadecimal value of "A7", offset 210 has a hexadecimal value of "BB", offset 212 has a hexadecimal value of "CF", and offset 214 has a hexadecimal value of "E3". According to this embodiment, in operation, a range of one or more bytes starting at each of offsets 202-214 may be locked and unlocked one or more times during the process of opening the file in response to a request from a user of a MS-Word application.

As mentioned above, however, the techniques described herein are not limited to any particular implementation of locks and lock operations, software applications, or operating systems, and therefore the examples and embodiments discussed in this section are to be regarded in an illustrative rather than a restrictive sense.

3.0 Approaches for Lock Optimization and Lock Prediction 3.1 Predicting Lock Request Sequences In one embodiment, a request for a first lock on a file is received from a software application. In this embodiment, application-level locks are implemented as locking and unlocking a range of one or more bytes in the file. When a request for a first lock is received, a sequence of lock requests for locks of various byte ranges in the file is determined based on the information in the request. The sequence of lock requests that will be received after the first lock request may be known, or may be predicted based on the prior usage of the first lock.

In other embodiments, the sequence of lock requests may be determined based on the first one or more lock requests that are received from an application. Each request of the first one or more lock requests may be for one or more locks on a data resource. In particular, the sequence of lock requests may be predicted based on a lock pattern that is established or determined by the one or more locks requested in the first one or more lock requests. In addition, information in the first one or more lock requests and/or the one or more locks requested therein, may be used to predict the rest of a lock pattern to which the one or more locks may belong.

For example, the sequence of lock requests that are expected may be previously known and documented as a locking and/or unlocking pattern of a software application. In another example, the sequence of lock requests may be determined by manually or automatically scanning trace files that store records, which indicate what locks were requested subsequently to previous requests for a pattern of one or more locks. In another example, the sequence of lock requests may be determined online based on the prior usage of the first one or more locks. However, regardless of the method used to determine the sequence of lock requests, the sequence can usually be determined with a relatively high degree of certainty because software applications execute a stable set of stored sequences of instructions that do not change unless the software application is replaced with another version.

After the sequence of lock requests for locks on the file is determined, one or more locks corresponding to lock requests in the sequence may be obtained in batch without waiting for an individual request for each lock. When the individual requests for each of the locks eventually arrive, the locks may be granted locally without sending additional lock requests to the file server that manages the locks on the file.

A Sequence of Lock Requests According to One Embodiment

One embodiment may be implemented in conjunction with the family of Microsoft Office® (MS-Office) software applications that execute on the Microsoft Windows® XP and Microsoft Windows® 2000 operating systems. In general, the MS-Office applications use the same mechanism to open a file for concurrent working by making calls to StgOpenStorageEx( )method that is included in the "o1e32.dll" dynamically linked library. When any MS-Office application wants to open a file, it issues the same sequence of lock requests for exclusive locks on several ranges of bytes in the file.

Figure 2B:
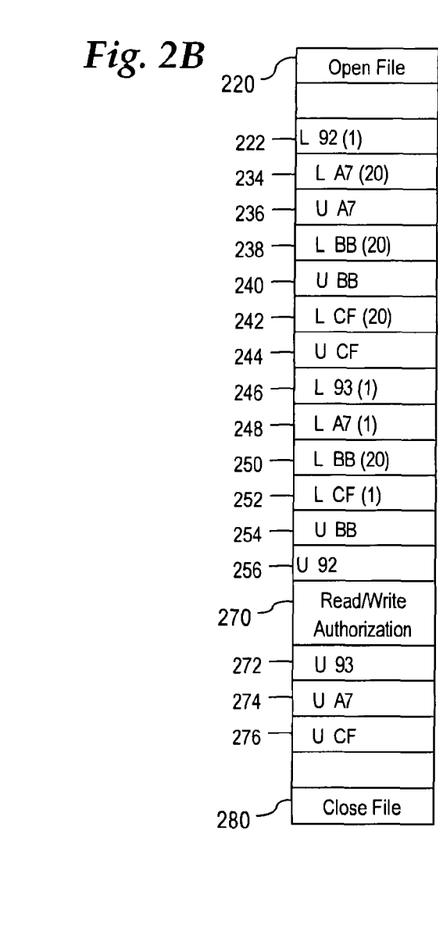
FIG. 2B is a block diagram that illustrates a sequence of lock and unlock requests according to one embodiment.

The sequence of lock requests according to this embodiment is depicted in FIG. 2B. In FIG. 2B, "L" stands for a lock request, "U" stands for an unlock request, the alpha-numerical string following an "L" or an "U" is the offset (in hexadecimal notation) where a range of bytes begins, and the numeral in brackets that follows the offset indicates the number (in decimal notation) of sequential bytes that are locked. Further, as discussed above with respect to FIG. 2A, the offsets depicted in FIG. 2B start from a hexadecimal base of "0x7FFFFF00" in the file. Thus, request 242 indicates that it is a lock request ("L") for a lock on a range of bytes that starts at offset "CF" and that is 20 bytes long.

In FIG. 2B, request 220 is a request from an MS-Office application to open a file in read/write mode, i.e. for reading and writing. A sequence of subsequent lock and unlock requests follows. The sequence is encapsulated within lock request 222 and unlock request 256. Inside the sequence, a series of lock and unlock requests are issued for offsets: "A7" (requests 234, 236, and 248), "BB" (requests 238, 240, 250, and 250), "CF" (requests 242, 244, and 252), and "93" (request 246).

Lock request 222 is a request for a lock on offset "92" in the file. Typically, when an MS-Office application first opens a file, it attempts to determine whether the file is already open by another application by trying to obtain an exclusive lock on offset "92". If the application does not succeed in obtaining a lock in response to lock request 222, then it decides that the file is opened by a non-MS-Office application, and does not open the file at all. If lock request 222 succeeds (e.g. offset "92" was not locked), then the application issues request 234 for a lock on a range of 20 bytes starting at offset "A7". If request 234 does not succeed, it is determined that another MS-Office application is using the file and the file can be open only in read-only mode. If request 234 succeeds, the application issues the rest of the lock and unlock requests, namely 236, 238, 240, 242, 244, 246, 248, 250, 252, and 254, in a similar manner.

Eventually, the MS-Office application issues request 256, which is an unlock request to release the lock on offset "92". When the lock on offset "92" is released, the MS-Office application presents the opened file to the user, and issues or records read/write authorization 270.

At this point the user may perform read, write, or any other operation on the file. During any operation, the MS-Office application holds locks on offsets "93", "A7", and "CF", which offsets were obtained in response to lock requests 246, 248, and 252, respectively. When the user has completed the file operations and wants to close the file, the MS-Office application issues requests 272, 274, and 276 to release the locks on offsets "93", "A7", and "CF", respectively. The MS-Office application then processes request 280, and closes the file.

Sequences of Lock Requests According to Other Embodiments

In other embodiments, an MS-Office application may use different lock sequences. For example, if the MS-Office application fails to obtain locks on offsets "93", "A7", and "CF", which are offsets from a hexadecimal base of "0x7FFFFF00", (e.g. requests 246, 248, and/or 252 have failed), but has successfully obtained a lock on offset "92" in response to request 222, the application may open the file as read-only, and the user of the application will not be allowed to write to the file. In this case, the MS-Office application may try to verify that the file is opened by another MS-Office application by sending a sequence of lock requests for locks on offsets "94", "A8", and "D0".

In another embodiment, the file may be a Microsoft Excel® (MS-Excel) workbook. In this embodiment, a flag associated with the file determines whether the file may be opened for shared use. If a file can be opened for shared use, the file is opened in a MS-Excel application and the user may work with the file. When the user decides to save any new data in the file, however, the MS-Excel application issues a sequence of lock requests for locks on offsets "93", "A7", and "CF" (which are also offsets from the hexadecimal base of "0x7FFFFF00") in a manner similar to the embodiment described above.

Based on the foregoing, it is clear that there is a variety of possible sequences of lock requests that may be determined based on a received request for a lock on a data resource. Furthermore, as mentioned above there are a variety of ways to determine what is the particular lock sequence in a given scenario or an operational context. For this reason, the techniques described herein are not limited to any particular manner of determining a sequence of lock requests based on a received request for a lock on a data resource, and the embodiments disclosed herein are to be viewed in an illustrative rather than restrictive sense.

3.2 Handling Misprediction of Lock Request Sequences

In one embodiment, a first message is sent from a local server to a remote server over a slow communication link, where the message includes a sequence of lock requests for locks on a file. In this embodiment, the remote server is communicatively connected to a file server that manages the file, and the remote server may obtain locks on the resource by sending the sequence of lock requests to the file server. If the requested locks are granted by the file server, the remote server responds by sending a message to the local server that includes all locks that were requested in the sequence of lock requests. If not all of the requested locks are granted by the file server, the remote server may return in a message only the locks that were granted, or may return a notification in the message indicating that not all locks in the sequence of lock requests can be granted at this time.

In another embodiment, a local server receives a request for a lock on a remote data resource from an application that is executing on a client that is communicatively connected to the local server. Based on the request, the local server determines a sequence of lock requests for locks on the resource, which sequence is expected to be received next from the application. The local server sends a message that includes the sequence of lock requests to a remote server that holds the remote data resource, and in response receives from the remote server a message that includes the requested one or more locks. Thereafter, the local server receives from the application another request for a lock on the remote data resource. The local server determines whether the requested lock is among the one or more locks received from the remote server. If the requested lock is among the one or more locks, the local server grants the request.

However, if the local server determines that the requested lock is not among the one or more locks, the local server concludes that the sequence of lock requests sent previously to the remote server was mispredicted. In this case, the local server sends a message to the remote server requesting that the one or more locks (that were previously granted by the remote server and are now held by the local server) be released. In other words, if the local server determines that it mispredicted the sequence of lock requests that it sent to the remote server, the local server releases the mispredicted locks it has received.

Different embodiments may use different ways to handle a misprediction of the sequence of lock requests. For example, if the local server determines that sequence of lock requests that it sent to the remote server is mispredicted, the local server may release the locks it holds and may commence relaying to the remote server any request for a lock that it receives from an application. In another example, if the local server determines that a sequence of lock requests is mispredicted based on receiving a request for a lock that it does not hold, the local server may just request the lock from the remote server, and may not release any locks it has received in response to sending the sequence of lock requests. Thus, the techniques described herein are not limited to any particular way of handling a mispredicted sequence of lock requests, and any feasible way of handling lock sequence misprediction may be employed in conjunction with the described approaches.

3.3 Obtaining and Granting Locks Requested in Lock Sequence Requests

In one embodiment, a local server sends a sequence of lock requests for locks on a remote data resource to a remote server, and receives one or more locks in response. Thereafter, in response to receiving any subsequent requests for the one or more locks, the local server grants the one or more locks locally without sending any lock requests to the remote server.

In one embodiment, the local server may grant, to an application executing on a client, a lock on a remote data resource that the local server has received from the remote server. In this embodiment, the local server may receive a subsequent request from the application to release the lock. The local server then sends a message to the application indicating that the lock was released, but in fact the local server may not send a request to the remote server to release the lock because the local server may anticipate that the application will request the same lock shortly. In this way, the application thinks that the lock was released and proceeds with its normal operation, while in fact the local server keeps the lock in order to avoid sending another request for the same lock to the remote server if the lock is requested one more time.

Overview of Message Exchanges According to One Embodiment

Figure 2C:
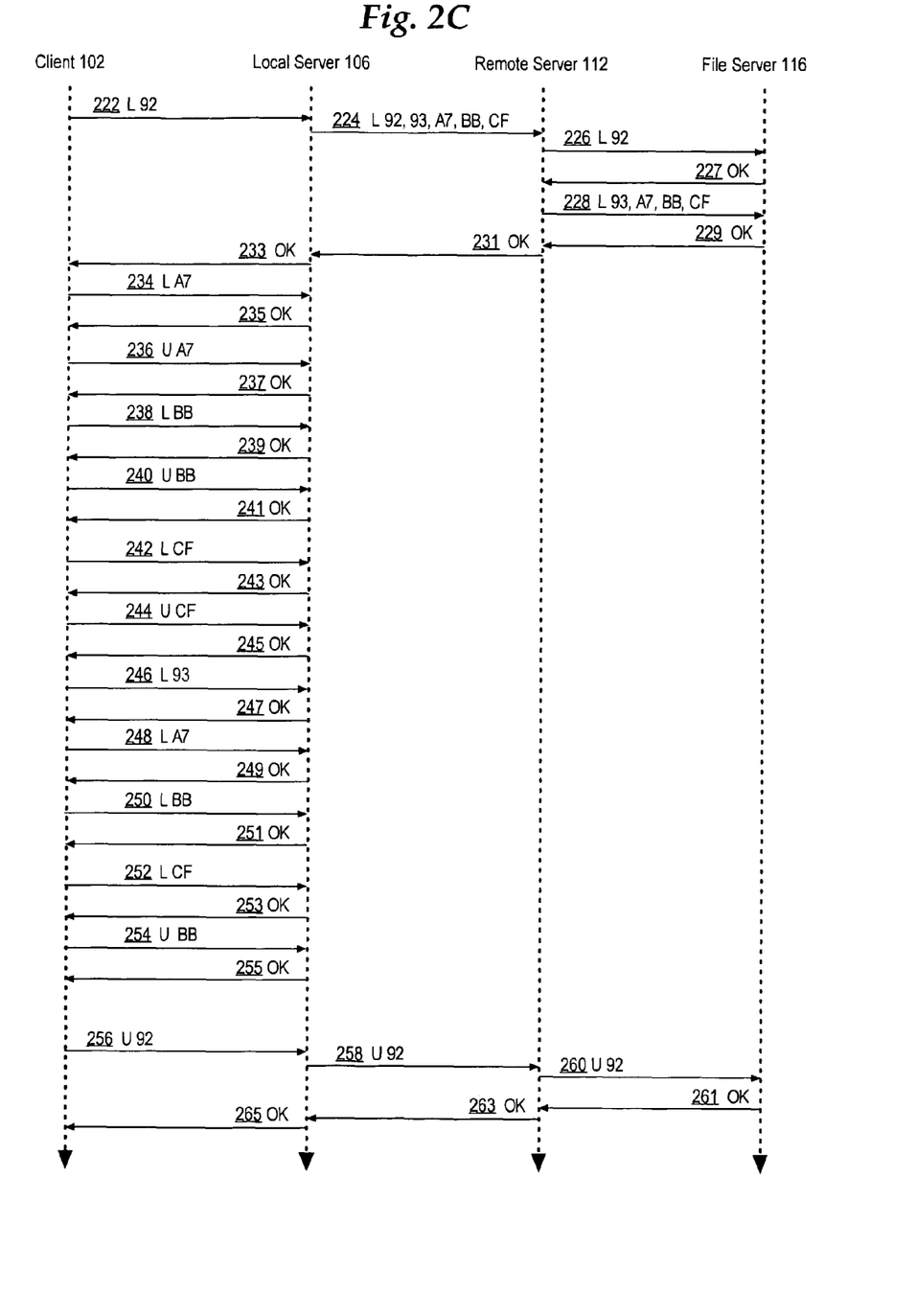
FIG. 2C is a flow diagram that illustrates an overview of communication exchanges according to one embodiment.

FIG. 2C is a flow diagram that illustrates an overview of the messages exchanged between a client, a local server, a remote server, and a file server holding a remote data file, such as client 102, local server 106, remote server 112, and file server 114 depicted in FIG. 1. Further, the messages exchanged are in relation to a sequence of lock requests that is depicted in FIG. 2B. Specifically, FIG. 2C depicts the messages exchanged according to an embodiment when a user of client 102 opens a file on file server 114 for read/write access through an MS-Office application. Also, the offsets discussed with respect to the requests depicted in FIG. 2C are from a hexadecimal base of "0x7FFFFF00" in the remote data file.

In this embodiment, a local server 106 receives message 222 from the application that executes on client 102. Message 222 includes a request for a lock on offset "92" of the file. According to the sequence of lock requests depicted in FIG. 2B, local server 106 determines that it needs to request locks on offsets "92", "93", "A7", "BB", and "CF".

Local server 106 then sends message 224 to remote server 112, where message 224 includes a sequence of lock requests for offsets "92", "93", "A7", "BB", and "CF". In line with the locking semantics of MS-Office applications, remote server 112 then sends to file server 114 message 226 that includes a request for lock on offset "92". Upon receipt of message 226, file server 116 grants the lock in response message 227. Remote server 112 then requests, in message 228, locks on offsets "93", "A7", "BB", and "CF", and file server 116 grants the locks in response message 229. Remote server 112 then sends local server 106 the locks on offsets "92", "93", "A7", "BB", and "CF" in message 231.

Local server 106 stores the received locks, and grants the lock on offset "92" to the application executing on client 102. At this point, local server 106 holds all the locks that may be requested by the application executing on client 102 during the operation of opening the file, and grants the locks to the application without sending any requests for locks to remote server 112.

Thus, when local server 106 receives message 234, it grants to the application lock on offset "A7" in message 235. In response to message 236, the local server sends message 237 indicating that the lock on offset "A7" was released. However, in anticipation of receiving another request for a lock on offset "A7", the local server does not release the lock to remote server 112 or file server 116.

In a similar manner, local server 106 performs the following steps: grants in message 239 a lock on offset "BB" that was requested in message 238, and releases the lock in message 241 in response to receiving message 240; grants in message 243 a lock on offset "CF" that was requested in message 242, and releases the lock in message 245 in response to receiving message 244; grants in message 247 a lock on offset "93" that was requested in message 246; grants in message 249 a lock on offset "A7" that was requested in message 248; grants in message 251 a lock on offset "BB" that was requested in message 250; grants in message 253 a lock on offset "CF" that was requested in message 252; and releases the lock held by the application on offset "BB" in message 255 in response to receiving from the application message 254.

At this point the application executing on client 102 holds locks on offsets "93", "A7", and "CF", and needs this set of locks to allow the user to perform read/write operations on the file. According to the locking semantics of MS-Office applications, the application must release the lock on offset "92" of the file, before it grants a read/write authorization to its user. Thus, the application sends message 256 to local server 106 with a request to release the lock on offset "92". Local server 106 relays the request to release the lock to remote server 112 in message 258, and in turn remote server 112 relays the request to file server 116 in message 260. File server 116 releases the lock on offset "92" in message 261, which it sends to remote server 112. Remote server 112 relays the release of the lock to local server 106 in message 263, and in message 265 the application is notified that the lock it held on offset "92" is released. Upon receiving message 265, the application knows that its user has read/write authorization on the file.

Referring to FIG. 1 and FIG. 2C, in the embodiment described above there were only four messages exchanged over the slow WAN link 110 between local server 106 and remote server 112, namely messages 224, 231, 258, and 263. In comparison, if the techniques described herein were not employed, there would have been 26 messages exchanged between local server 106 and remote server 112. Thus, the techniques described herein provide for reducing network latency in opening the remote data file because of the reduced number of exchanged messages, and for faster response times.

4.0 Implementation Mechanisms—Hardware Overview

Figure 4:
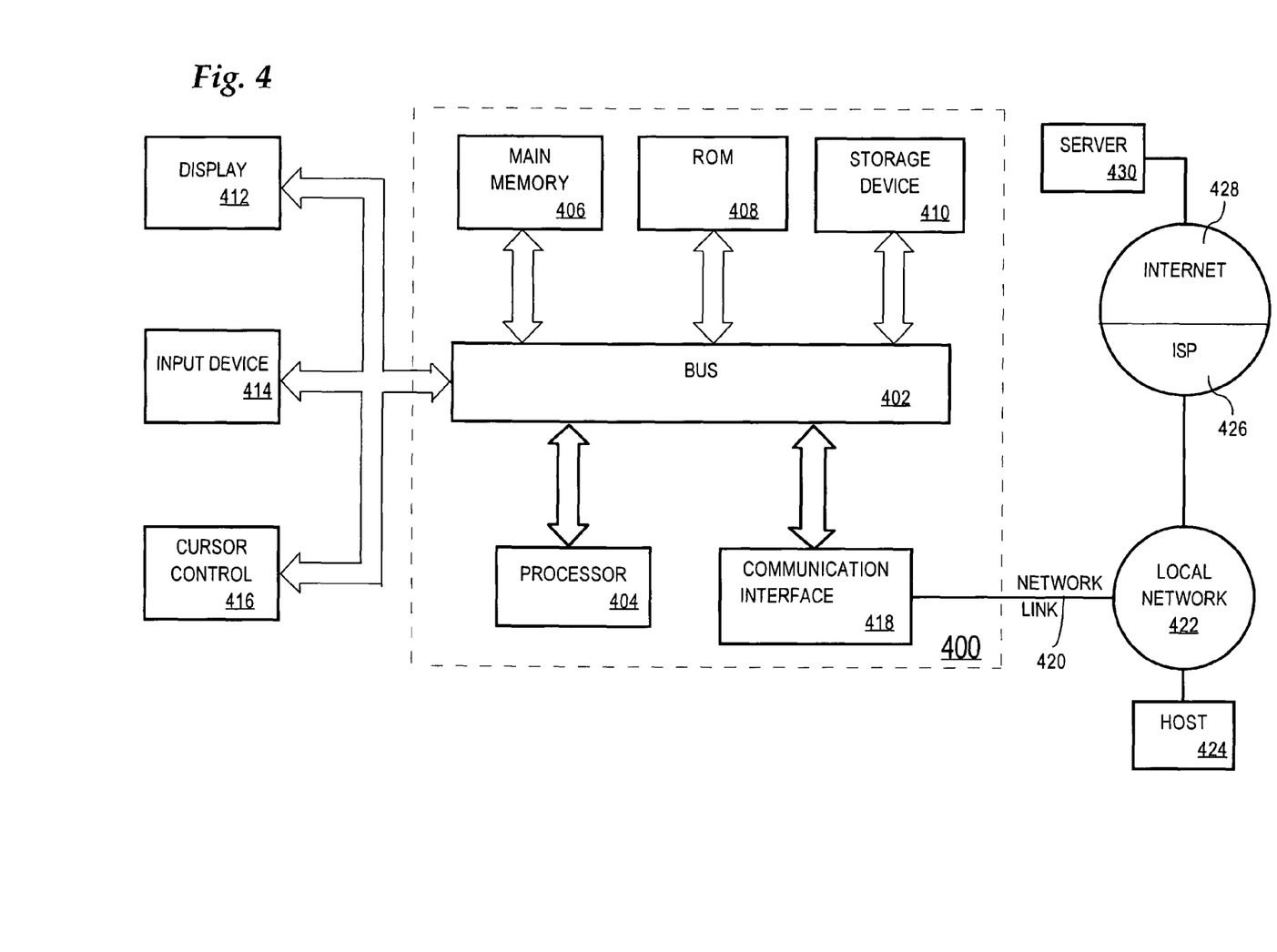
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for providing lock optimization and lock prediction. According to one embodiment of the invention, lock optimization and lock prediction is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for lock optimization and lock prediction as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the computer-implemented actions of:
   receiving first one or more lock requests for first one or more locks on a remote data resource that is linked by a slow communication link;
   based on the first one or more lock requests, determining a sequence of new lock requests for new locks, including a plurality of predicted locks, on the remote data resource;
   sending a first message that includes the sequence of new lock requests;
   receiving a second message that includes second one or more locks on the remote data resource, wherein the second one or more locks correspond to second one or more lock requests of the sequence of new lock requests;
   storing the second one or more locks; and
   granting a particular lock of the second one or more locks in response to receiving a particular lock request for the particular lock on the remote data resource.

2. The method as recited in claim 1, further comprising obtaining the second one or more locks on the remote data resource in response to receiving the first message at a remote server that holds the remote data resource.

3. The method as recited in claim 2, wherein:
   the remote data resource is a file; and
   obtaining the second one or more locks further comprises locking, for each lock of the second one or more locks, a range of bytes in the file.

4. The method as recited in claim 3, wherein the range of bytes comprises any one of a single byte, a plurality of bytes, and all bytes in the file.

5. The method as recited in claim 2, wherein obtaining the second one or more locks further comprises any one of obtaining all locks that are requested in the sequence of new lock requests and obtaining less than all locks that are requested in the sequence of new lock requests.

6. The method as recited in claim 1, further comprising sending a third message that includes one or more unlock requests to release any one of:
   at least one lock of the first one or more locks, and
   at least one lock of the second one or more locks.

7. The method as recited in claim 1, wherein the particular lock request for the particular lock is received after receiving the first one or more lock requests for the first one or more locks.

8. The method as recited in claim 1, further comprising receiving an unlock request to release the particular lock.

9. The method as recited in claim 1, wherein the remote data resource is a file managed by a file server that is communicatively connected to a remote server over a Local Area Network (LAN) connection, wherein the remote server is connected to the slow communication link.

10. The method as recited in claim 1, further comprising sending the first one or more lock requests for the first one or more locks to a local server from an application.

11. The method as recited in claim 10, wherein the application is executing on at least one of:
   the local server; and
   a client that is communicatively connected to the local server over a Local Area Network (LAN) connection.

12. The method as recited in claim 10, wherein:
   sending the first one or more lock requests is performed in response to receiving, at the application, a user request to perform an operation on the remote data resource; and
   the method further comprises performing the operation on the remote data resource.

13. The method as recited in claim 1, further comprising:
   receiving a specific request for a specific lock on the remote data resource;
   determining whether the specific lock is among the second one or more locks; and
   if the specific lock is not among the second one or more locks, then sending a third message that includes one or more unlock requests to release any one of:
      at least one lock of the first one or more locks, and
      at least one lock of the second one or more locks.

14. The method as recited in claim 1, wherein determining the sequence of new lock requests further comprises predicting the sequence of new lock requests based on prior usage of the first one or more locks.

15. The method as recited in claim 14, wherein predicting the sequence of new lock requests further comprises automatically determining the prior usage of the first one or more locks based on trace files that store records indicating which locks were requested subsequently to prior requests for the first one or more locks.

16. The method as recited in claim 1, wherein the second one or more lock requests are a subset of the sequence of new lock requests.

17. The method as recited in claim 1, wherein the slow communication link is any one of a dial-up connection, a Wide Area Network (WAN) connection, a Digital Subscriber Line (DSL) connection, and an Integrated Services Digital Network (ISDN) connection.

18. A method of optimizing communication exchanges, the method comprising the computer-implemented actions of:
   at a local server that is communicatively connected to a remote server over a slow communication link, receiving first one or more lock requests for first one or more locks on a remote data resource of the remote server;
   based on the first one or more lock requests, determining a sequence of new lock requests for new locks, including plurality of predicted locks, on the remote data resource;
   sending a first message to the remote server, wherein the first message includes the sequence of new lock requests;
   receiving, from the remote server, a second message that includes second one or more locks on the remote data resource, wherein the second one or more locks correspond to second one or more lock requests of the sequence of new lock requests;
   storing the second one or more locks at the local server; and
   at the local server, granting a particular lock of the second one or more locks in response to receiving a particular lock request for the particular lock on the remote data resource.

19. The method as recited in claim 18, further comprising sending, to the remote server, a third message that includes one or more unlock requests to release any one of:
   at least one lock of the first one or more locks, and
   at least one lock of the second one or more locks.

20. The method as recited in claim 18, further comprising releasing the particular lock of the second one or more locks in response to receiving an unlock request to release the particular lock.

21. A system for optimizing communication exchanges, the system comprising:
  a remote server that is communicatively connected to a file server over a Local Area Network (LAN) connection, wherein the file server manages a remote data resource;
  a local server that is communicatively connected to the remote server over a Wide Area Network (WAN) communication link, wherein the local server comprises:
    one or more processors; and
    one or more stored sequences of instructions, which instructions, when executed by the one or more processors, cause the one or more processors to perform the actions of:
      receiving first one or more lock requests for first one or more locks on the remote data resource;
      based on the first one or more lock requests, determining a sequence of new lock requests for new locks, including a plurality of predicted locks, on the remote data resource;
      sending a first message to the remote server, wherein the first message includes the sequence of new lock requests;
      receiving, from the remote server, a second message that includes second one or more locks on the remote data resource, wherein:
        the remote server has obtained the second one or more locks from the file server; and
        the second one or more locks correspond to second one or more lock requests of the sequence of new lock requests;
      storing the second one or more locks; and
      granting a particular lock of the second one or more locks in response to receiving a particular lock request for the particular lock on the remote data resource.

22. An apparatus, comprising:
  receiving means for receiving first one or more lock requests for first one or more locks on a remote data resource that is linked by a slow communication link;
  determining means for determining, based on the first one or more lock requests, a sequence of new lock requests for new locks, including a plurality of predicted locks, on the remote data resource;
  sending means for sending a first message that includes the sequence of new lock requests;
  second receiving means for receiving a second message that includes second one or more locks on the remote data resource, wherein the second one or more locks correspond to second one or more lock requests of the sequence of new lock requests;
  storing means for storing the second one or more locks; and
  granting means for granting a particular lock of the second one or more locks in response to receiving a particular lock request for the particular lock on the remote data resource.

23. The apparatus of claim 22, wherein:
  the remote data resource is a file; and
  each lock of the second one or more locks comprises a locked range of bytes in the file, wherein the locked range of bytes comprises any one of a single byte, a plurality of bytes, and all bytes in the file.

24. The apparatus of claim 22, further comprising second sending means for sending a third message that includes one or more unlock requests to release any one of: at least one lock of the first one or more locks, and at least one lock of the second one or more locks.

25. The apparatus of claim 22, further comprising third receiving means for receiving an unlock request to release the particular lock.

26. The apparatus of claim 22, further comprising:
  third receiving means for receiving a specific request for a specific lock on the remote data resource;
  determination means for determining whether the specific lock is among the second one or more locks; and
  second sending means for sending a third message that includes one or more unlock requests to release any one of:
    at least one lock of the first one or more locks, and
    at least one lock of the second one or more locks.

27. An apparatus, comprising:
  one or more processors;
  one or more storage devices storing one or more sequences of instructions, which the instructions, when executed by the one or more processors, cause the one or more processors to perform the actions of:
    receiving first one or more lock requests for first one or more locks on a remote data resource that is linked by a slow communication link;
    based on the first one or more lock requests, determining a sequence of new lock requests for new locks, including a plurality of predicted locks, on the remote data resource;
    sending a first message that includes the sequence of new lock requests;
    receiving a second message that includes second one or more locks on the remote data resource, wherein the second one or more locks correspond to second one or more lock requests of the sequence of new lock requests;
    storing the second one or more locks; and
    granting a particular lock of the second one or more locks in response to receiving a particular lock request for the particular lock on the remote data resource.

28. The apparatus of claim 27, wherein:
  the remote data resource is a file; and
  each lock of the second one or more locks comprises a locked range of bytes in the file, wherein the locked range of bytes comprises any one of a single byte, a plurality of bytes, and all bytes in the file.

29. The apparatus of claim 27, wherein the instructions cause the one or more processors to perform the action of sending a third message that includes one or more unlock requests to release any one of:
  at least one lock of the first one or more locks, and
  at least one lock of the second one or more locks.

30. The apparatus of claim 27, wherein the instructions cause the one or more processors to perform the action of receiving an unlock request to release the particular lock.

31. The apparatus of claim 27, wherein the instructions cause the one or more processors to receive the first one or more lock requests for the first one or more locks from an application.

32. The apparatus of claim 27, wherein the instructions further cause the one or more processors to perform the actions of:
  receiving a specific request for a specific lock on the remote data resource;
  determining whether the specific lock is among the second one or more locks; and if the specific lock is not among the second one or more locks, then sending a third message that includes one or more unlock requests to release any one of:
   at least one lock of the first one or more locks, and
   at least one lock of the second one or more locks.

33. The apparatus of claim 27, wherein the instructions causing the one or more processors to perform the action of determining the sequence of new lock requests further cause the one or more processors to perform the step of predicting the sequence of new lock requests based on prior usage of the first one or more locks.

34. The apparatus of claim 33, wherein the instructions causing the one or more processors to perform the action of predicting the sequence of new lock requests further cause the one or more processors to perform the step of determining the prior usage of the first one or more locks based on trace files that store records indicating which locks were requested subsequently to prior requests for the first one or more locks.

35. A computer-readable storage device storing one or more sequences of instructions, which instructions, when executed by one or more processors, cause the one or more processors to perform the actions of:
   receiving first one or more lock requests for first one or more locks on a remote data resource that is linked by a slow communication link;
   based on the first one or more lock requests, determining a sequence of new lock requests for new locks, including a plurality of predicted locks, on the remote data resource;
   sending a first message that includes the sequence of new lock requests;
   receiving a second message that includes second one or more locks on the remote data resource, wherein the second one or more locks correspond to second one or more lock requests of the sequence of new lock requests;
   storing the second one or more locks; and
   granting a particular lock of the second one or more locks in response to receiving a particular lock request for the particular lock on the remote data resource.

* * * * *